J. H. BREWER.
Garden-Hoe.
No. 65,053.
Patented May 28. 1867.
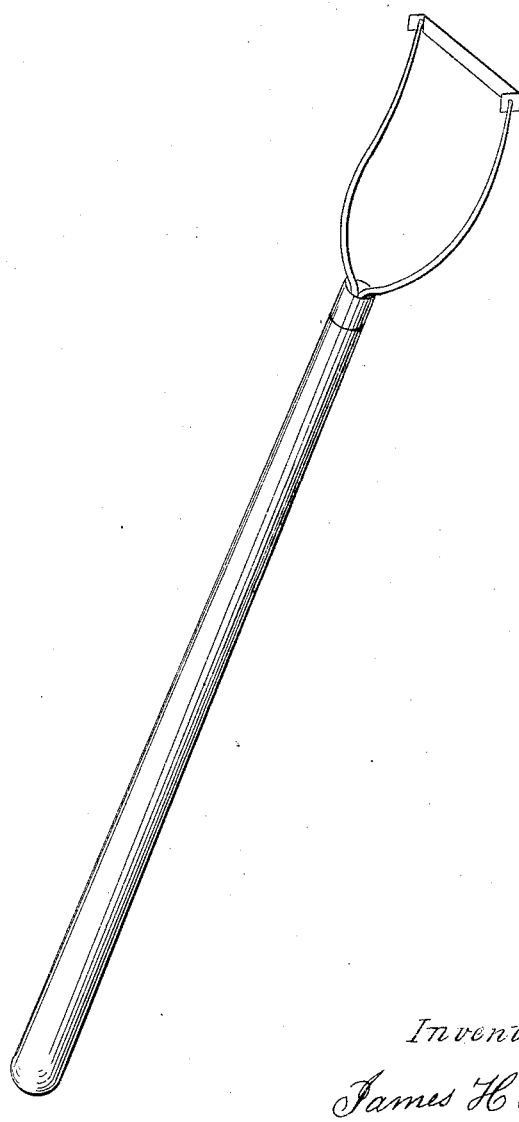
Witnesses.
Charles E. McAlister
George F. Fish
Inventor:
James H Brewer

United States Patent Office.

JAMES H. BREWER, OF ATLAS, MICHIGAN.

Letters Patent No. 65,053, dated May 28, 1867.

---

GARDEN-HOE.

---

The Schedule referred to in these Letters Patent and making part of the same.

---

TO ALL WHOM IT MAY CONCERN:

Be it known that I, JAMES H. BREWER, of the town of Atlas, county of Genesee, and State of Michigan, have invented a new and useful improvement on a Garden-Hoe; and I do hereby declare that the following is a full and exact description of the said invention.

The nature of my invention consists in the form of the hoe and its attachment to the shank. To enable others to make and use the same, I will proceed to describe its construction.

I construct a garden-hoe with a thin, flat steel blade from one-half to one and a half inch wide, and from four to twelve inches long, as desired for use, with the ends turned up at right angles so as to form an upright cutter one-half to one inch high; the shanks to be secured to the top of the end turned up and uniting in the hoe-handle, thus clearing the weeds and earth and preventing clogging, all of which is shown in the accompanying drawings.

What I claim as my invention, is—

Turning up the ends of the blade and forming upright cutters at right angles to the main blade, in combination with attaching the shanks to the outer and upper portion of the turned-up end of the blade to clear weeds and earth.

JAMES H. BREWER.

Witnesses:
   J. BRUSH FENTON,
   WM. M. FENTON.